United States Patent
Kampanakis et al.

(10) Patent No.: US 10,841,164 B2
(45) Date of Patent: Nov. 17, 2020

(54) ONLINE GENERATION AND UPDATES OF IOT MUD POLICIES

(71) Applicant: Cisco Technology, Inc., San Jose, CA (US)

(72) Inventors: Panagiotis Theodorou Kampanakis, Cary, NC (US); Blake Harrell Anderson, San Jose, CA (US); Brian E. Weis, San Jose, CA (US); Charles Calvin Byers, Wheaton, IL (US); M. David Hanes, Lewisville, NC (US); Joseph Michael Clarke, Raleigh, NC (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 165 days.

(21) Appl. No.: 15/892,951

(22) Filed: Feb. 9, 2018

(65) Prior Publication Data
US 2019/0253319 A1    Aug. 15, 2019

(51) Int. Cl.
*H04L 12/24*    (2006.01)
*H04L 12/26*    (2006.01)
*G06N 5/02*    (2006.01)

(52) U.S. Cl.
CPC ......... *H04L 41/0893* (2013.01); *G06N 5/025* (2013.01); *H04L 41/0816* (2013.01); *H04L 43/08* (2013.01)

(58) Field of Classification Search
CPC .. H04L 41/0893; H04L 41/08; H04L 41/0816
See application file for complete search history.

(56) References Cited

U.S. PATENT DOCUMENTS

| | | |
|---|---|---|
| 6,170,009 B1 | 1/2001 | Mandal et al. |
| 7,120,931 B1 | 10/2006 | Cheriton |
| 8,756,653 B2 | 6/2014 | Jacobson |
| 8,959,571 B2 | 2/2015 | Dan |
| 2006/0271677 A1 | 11/2006 | Mercier |
| 2016/0094585 A1* | 3/2016 | Shahbazian ........... H04L 63/105 726/1 |

(Continued)

OTHER PUBLICATIONS

Laureano, et al., "Intrusion detection in virtual machine environments", Proceedings. 30th Euromicro Conference, 2004, pp. 520-525, IEEE.

*Primary Examiner* — Jason D Recek
(74) *Attorney, Agent, or Firm* — Behmke Innovation Group LLC; James M. Behmke; James J. Wong

(57) ABSTRACT

In one embodiment, a classification device in a computer network analyzes data from a given device in the computer network, and classifies the given device as a particular type of device based on the data. The classification device may then determine whether a manufacturer usage description (MUD) policy exists for the particular type of device. In response to there being no existing MUD policy for the particular type of device, the classification device may then determine patterns of the analyzed data, classify the patterns into context-based policies, and generate a derived MUD policy for the particular type of device based on the context-based policies. The classification device may then apply one of either the existing or derived MUD policy for the given device within the computer network.

19 Claims, 5 Drawing Sheets

(56) References Cited

U.S. PATENT DOCUMENTS

2016/0342977 A1* 11/2016 Lam .................. G06Q 20/0658
2017/0033984 A1    2/2017 Lear et al.
2018/0191729 A1*  7/2018 Whittle .............. H04L 63/0227
2018/0270200 A1*  9/2018 Byrne ................ H04L 63/0263
2019/0132205 A1*  5/2019 Du ..................... H04L 41/069

* cited by examiner

ONLINE GENERATION AND UPDATES OF IOT MUD POLICIES

TECHNICAL FIELD

The present disclosure relates generally to computer networks, and, more particularly, to online generation and updates of Internet of Things (IoT) manufacturer usage description (MUD) policies.

BACKGROUND

With the onset of the Internet of Things (IoT), Manufacturer Usage Description (MUD) has been developed as an Internet Engineering Task Force (IETF) standard to allow IoT manufacturers to explicitly state how their devices should communicate, which significantly reduces the attack surface available to IoT-focused threat actors. For instance, a MUD policy file describes the traffic flows the endpoints are expected to generate, and network operators can use the file to enforce policies in order to control the activities of these devices. In certain contexts like IoT, such functionality is very important for security since compromised endpoints could potentially introduce risks to the infrastructure that interconnects them.

MUD does introduce a burden to manufacturers, and adoption may never be 100%. That is, even though many vendors will start serving MUD files, not all of them are expected to offer such functionality consistently and correctly. Additionally, many legacy IoT devices have been already deployed which will never have a MUD file created by its manufacturer. Manual profiling methods have been deployed to address some of these devices, but because it is manual, such profiling is time consuming and does not scale well to the sheer number of variety of IoT devices liable to be introduced to an enterprise network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
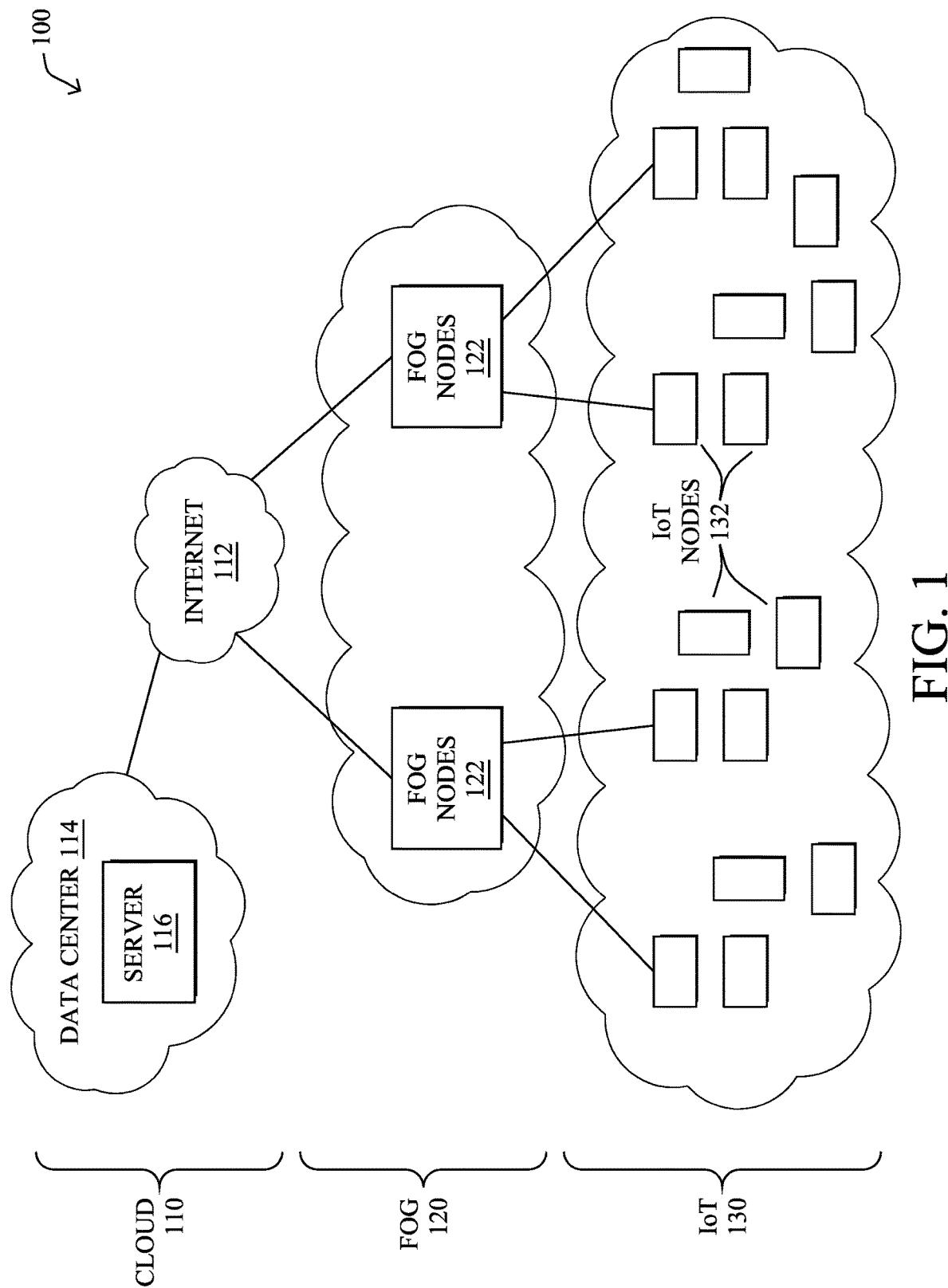
FIG. 1 illustrates an example computer network.

According to one or more embodiments of the disclosure, a classification device in a computer network analyzes data from a given device in the computer network, and classifies the given device as a particular type of device based on the data. The classification device may then determine whether a manufacturer usage description (MUD) policy exists for the particular type of device. In response to there being no existing MUD policy for the particular type of device, the classification device may then determine patterns of the analyzed data, classify the patterns into context-based policies, and generate a derived MUD policy for the particular type of device based on the context-based policies. The classification device may then apply one of either the existing or derived MUD policy for the given device within the computer network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, high bit error rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer or hierarchy of layers from local networks (e.g., IoT networks) to the cloud (e.g., centralized and/or shared resources, as will be understood by those skilled in the art). That is, generally, fog computing entails using devices at the network edge to provide application services, including computation, networking, and storage, in close proximity to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple peer-to-peer and hierarchical layers of fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
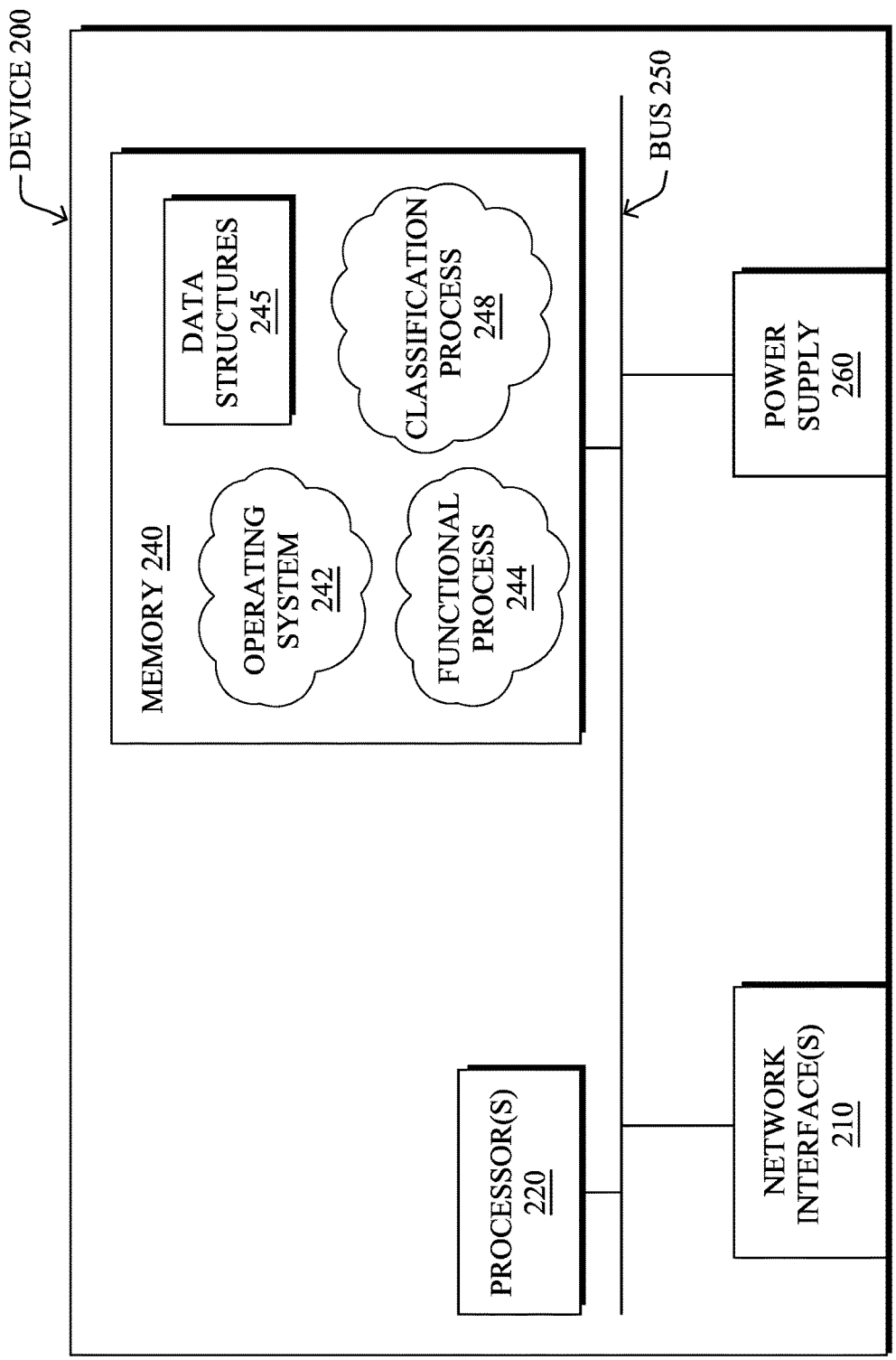
FIG. 2 illustrates an example computing device/node.

FIG. 2 is a schematic block diagram of an example node/device 200 that may be used with one or more embodiments described herein, e.g., as any of the computing devices shown in FIG. 1, particularly a server 116, fog nodes 122, or any other computing device that supports the operations of techniques herein, or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise one or more functional processes 244 and illustratively, a classification process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Functional process(es) 244 may include computer executable instructions executed by processor 220 to perform one or more specific functions of the device 200, such as one or more communication protocols, routing protocols, control protocols, etc., as will be understood by those skilled in the art. For example, depending upon the type of device within the network, functional process 244 may be configured to perform specific functions corresponding to that device, such as a router performing router operations, a fog node performing fog node operations, IoT nodes performing their specifically configured functions, and so on.

In various embodiments, classification process 248, described further below, may utilize machine learning techniques. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of classifying an IoT device type, for example, a learning machine may construct a model of the behavior of the device, to detect data points that deviate from this model. For example, a given model (e.g., a supervised, un-supervised, or semi-supervised model) may be based on the traffic characteristics observed for the IoT device, such as when the device type typically communicates, the size of the packets, the destinations, etc. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), neural networks (e.g., reservoir networks, artificial neural networks, etc.), support vector machines (SVMs), or the like. In various specific embodiments, clustering approaches can be used. Generally speaking, clustering is a family of techniques that seek to group data according to some typically predefined notion of similarity. Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

- -Online Generation and Updates of IoT MUD Policies- -

As noted above, Manufacturer Usage Description (MUD) policies allow IoT manufacturers to explicitly state how their devices should communicate (e.g., the traffic flows the endpoints are expected to generate, connections they are expected to make, and so on). MUD policies/files, in particular, can be used by network devices to control the activities of these devices, and are typically arranged as access control list (ACL)-style policies applied to IoT endpoints. Notably, MUD policies are not exactly the same as ACLs, as they involve structures about communication that do not follow the 5-tuple communication paradigm (protocol, source address, destination address, source port, destination port). As also mentioned above, however, not all manufacturers have or will adopt the MUD protocol, and many legacy IoT devices have been already deployed which will never have a MUD file created by its manufacturer. Some manufacturer's MUD files could be so incomplete or full of errors that their use in some IoT networks would be counterproductive.

The techniques herein, therefore, dynamically generate MUD policies for devices with an unknown MUD specification, and keep these policies up-to-date as the behavior of the endpoint changes. In particular, observed network traffic (a detailed set of data features) can be analyzed and used to create training data, which can be translated into a granular MUD policy file. Notably, as described below, the techniques herein do not simply translate a traffic 5-tuple into an access control list (ACL), but uses machine learning (ML) to dynamically generate a MUD file or update one that is applicable to the same type of device regardless of the network in which it is deployed. The MUD policy file may then be continuously updated with new derived rules based in part on data from policy violation logs. All rules are continuously monitored to ensure that they are behaving appropriately, and continuously adjusted via machine learning techniques.

Specifically, according to one or more embodiments of the disclosure as described in detail below, a classification device in a computer network analyzes data from a given device in the computer network, and classifies the given device as a particular type of device based on the data. The classification device may then determine whether a MUD policy exists for the particular type of device. In response to there being no existing MUD policy for the particular type of device, the classification device may then determine patterns of the analyzed data, classify the patterns into context-based policies, and generate a derived MUD policy for the particular type of device based on the context-based policies (e.g., without significant manual intervention). The classification device may then apply one of either the existing or derived MUD policy for the given device within the computer network to help manage the device.

Illustratively, the techniques described herein may be performed by hardware, software, and/or firmware, such as in accordance with the classification process 248, which may include computer executable instructions executed by the processor 220 of a "classification device" (e.g., a server, fog node, router, access point, etc.) to perform functions relating to the techniques described herein, e.g., in conjunction with other participating devices (e.g., information gathering, information sharing, information processing, etc.).

Figure 3:
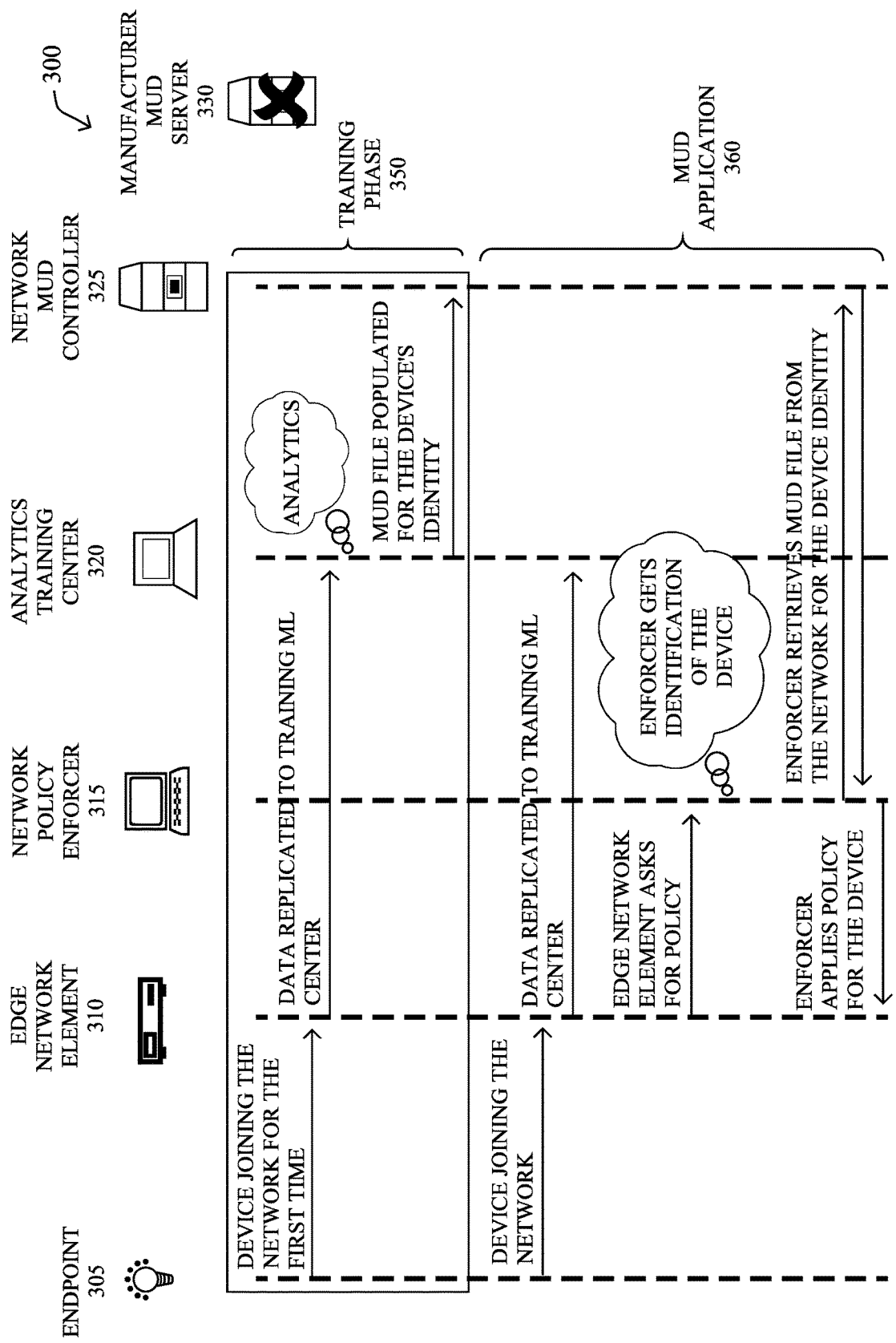
FIG. 3 illustrates an example of dynamic device identification and manufacturer usage description (MUD) policy implementation.

Operationally, the techniques herein use, generate, or update a MUD file according to observed network information. In particular, and with reference to FIG. 3 illustrating one example embodiment of a MUD policy system 300, when an endpoint 305 (e.g., IoT device 132, such as a sensor, actuator, personal computer, laptop, tablet, cellular, phablet, etc.) joins a network through an edge network element (e.g., fog node 122, switch, etc.), the techniques herein can determine how to apply MUD policies, even when a MUD file is not available by the manufacturer (manufacturer MUD server 330 either does not exist or does not have a MUD file for this device, or is not reachable by a LAN). (Note that MUD policies will generally be used/created only for endpoints where MUD policies apply.)

As described in greater detail below, an analytics training center 320 may be configured to be responsible for running analytics and, if necessary, Machine Learning (ML) algorithms that will study the behavior of the endpoint 305. The network policy enforcer 315 (e.g., an identity services engine (ISE)) may be configured to be responsible for enforcing MUD policies at the edge network element or fog node 310 that the endpoint connects to. The network MUD controller 325 is the server that serves the MUD files that are generated by the analytics training center 320 (or, notably, the MUD files that are conventionally provided by the manufacturer MUD server 330, if available). The MUD controller 325 can be central to an organization or even a federation of organizations that have agreed that one entity will be responsible for offering MUD services.

Within the illustrative "training phase" 350 of FIG. 3, training data may be collected from the joining endpoint 305 (e.g., an unknown IoT device) for the first t_0 minutes of traffic, which may be used to associate that IoT device with one or more known MUD policy files (from known IoT devices), or to generate a new MUD policy (that is, inferring device types and dynamically locating and/or generating MUD policy files bound to the device types using ML), as described below. Said differently, the network traffic data is fed to a machine learning system in order to train a classification system that will provide IoT device "fingerprints" to identify newly joining devices. (Note that in addition to the network traffic, specific identifying information regarding the type of device may also be explicitly provided as feature data to the ML system, such as, for example, a model number, model name, serial number, firmware version number, software version number, manufacturer name, etc., in order provide the most accurate fingerprint.) As described below, this training may also be used to create a MUD file, if one doesn't already exist, or may update existing MUD files.

Once a MUD file exists for the identified device (from the manufacturer or previously generated as described below), then in the MUD application phase 360 of the network communication shown in FIG. 3, the fingerprints learned can be used to identify the devices, and the retrieved MUD file may be used. Going forward, the enforcer applies the policies within the network, and any anomalies in analyzed traffic that are found that deviate from the allowed network access or type of service according to the MUD policy may be flagged, alarmed, recorded in detail, or blocked, as they could indicate security or performance problems with the device. These anomalies can then be used by the manufacturers and network administrators to refine their MUD files or to identify potential bugs or attacks relative to their devices, and in some embodiments even prevent said attacks before they grow severe enough to impact network performance or security.

On the other hand, if a MUD policy file does not exist, then according to the techniques herein, in order to study the behavior of an endpoint, a training process takes place to understand the characteristics of legitimate traffic for a newly installed device class. (Notably, this process described below does not require a separate lab set up where the device gets analyzed, but can instead occur in real-time based on network traffic from the joined endpoint.) In particular, as part of the training process, the techniques herein can take a newly joined endpoint (or a plurality of devices of the same type, fingerprint, or model), without a known MUD file, and analyze the traffic for patterns. Even though the device(s) could be assumed secure, the techniques herein can either give the network policy enforcer the choice whether to allow it to join the network or, alternatively, network operators could proactively place the endpoint in an isolated network that will allow it to go through its joining phase. Regardless, after the endpoint has joined the network, a copy of its session data may be sent to the analytics training center, which uses this data to understand what legitimate traffic looks like. The data used in the training server could be replicated packets from the network edge endpoint, connection flow data, externally generated metadata, or externally captured packets. Additionally, the training center may look at the domain name server (DNS) distinct names requests, the common or proprietary protocols, sockets, and connections opened in relation to these names, hypertext transfer protocol (HTTP) uniform resource identifiers (URIs), Media Access Control (MAC) addresses, transport layer security (TLS) certificates and more. The information to be gleaned by applying traffic profiling and analytics on this data may be one or more of the following:

Distinct cloud destinations, protocols and ports the endpoint communicates with (e.g., outbound).

Local Controllers and servers the endpoint communicates with. The MUD controller can possibly enrich the data with locally relevant information such as IP addresses of local building servers. A MUD Controller will need some local configuration even to deal with third party MUD files to translate server types to local IP addresses.

Local communication protocols such as Dynamic Host Configuration Protocol (DHCP), DNS the endpoint uses, etc.

Device+Manufacturer or Class of the endpoint.

When possible, manual establishment of the Device+Manufacturer can take place by the administrator, or by leveraging identity services provided by the network policy enforcer (e.g., ISE) or by standard ML algorithms (e.g., unsupervised or semi-supervised learning). This information can be used to generate the appropriate policy specific to the endpoints.

Notably, there will be cases where the collected data features from a device will not match exactly in the training data or there is no MUD policy associated with the matched data features. In this case, such as if this is the first time the endpoint is seen on the network, the endpoint can either be profiled to belong to a more generic class (e.g., "all security cameras" or "all smoke detectors"), or, according to the techniques herein, the actual MUD policy file needs to be generated according to the data features collected. That is, the techniques herein may rely on machine learning algorithms and ground truth data, using devices with known MUD files, the data features mentioned in the bullets above, and multi-label learning, to classify devices and create dynamic MUD policies.

Creating such a policy description file from the training data is not straightforward, which is why the techniques herein provide a classifier-based approach to creating MUD policies. For example, the techniques herein not only create two access control lists (ACLs), one controlling traffic generated by the device ("from-device") and another destined to the device ("to-device", not necessarily symmetric with the from-device ACL), but they also establish additional important context included in the MUD policy. That is, while the IP address of a peer may be determined from observed network traffic, there is often context required to know how to translate the destination of the observed network traffic into roles as defend in a MUD file policy description. In particular, often the IP address of a peer is not valuable in a MUD file because its presence would restrict the context of the MUD file policy to the local network. However, when that IP address is translated into its role (e.g., "lighting controller") then a valuable MUD policy description file can be generated. For further examples, such a developed policy may include the "controller" or "my-controller" field in a MUD file policy, as will be appreciated by those skilled in the art. Similarly, sometimes groups of the same type of IoT devices (e.g., particular light fixtures of a given manufacturer) are required to communicate directly. Translating the group traffic to a "same-manufacturer" policy description in a MUD file would thus be necessary.

Figure 4:
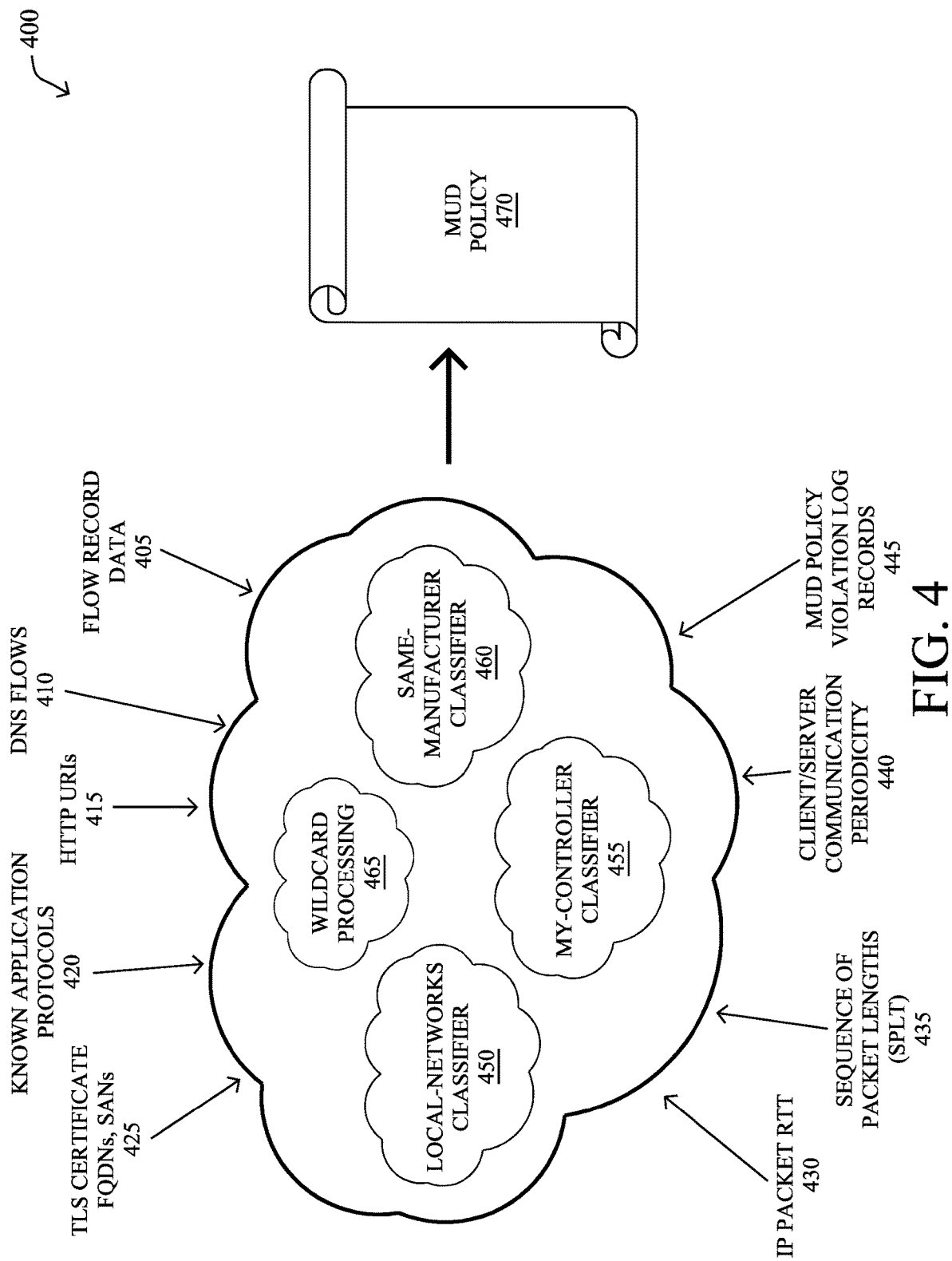
FIG. 4 illustrates an example of dynamic MUD policy generation.

With reference generally to the training model 400 in FIG. 4, the techniques herein use multi-flow features, and adds coarse features about the sessions. The data features gathered across sessions in the model may include flow record data 405, such as device identities and manufacturers, the number of connections, and bytes transferred to a hostname: port pair, among other features. The techniques herein further enrich the data with DNS flows 410, HTTP URIs 415, known application protocols 420 (e.g., IoT application protocols), and TLS certificate information 425 (e.g., including fully qualified domain name (FQDN) entries or subject alternative names (SANs)). Further data input to the model 400 may include such things as IP packet round trip time (RTT) 430, sequence of packet lengths and inter-arrival times (SPLT) 435, client/server communication periodicity 440, and so on. The techniques herein may also leverage log data that point to device communication deviations, such as MUD policy violation log records 445. The goal is to correlate the known traffic in the training dataset with the information observed in the policy logs, and use this additional information to create and then refine the MUD policy 470 over time. Notably, training data can also be supplemented with lab data, optionally with purposefully restrictive rules.

The data is processed by using ML classification (e.g., local-networks classifier 450, my-controller classifier 455, same-manufacturer classifier 460, and so on), as well as simple wildcard processing 465. The generated MUD rules 470 according to the MUD protocol can be categorized in local communications, controller, and my-controller communications, Internet communications, manufacturer and my-manufacturer, and device model communications, as may be appreciated by those skilled in the art. These rules may be illustratively generated from the collected data as follows:

"my-controller" communications rules may be generated using ML classification using data features including SPLT, server port(s), and inter-flow features such as periodicity between the client/server. The training set consists of examples of my-controller traffic as positives and general IoT traffic as negatives.

"same-manufacturer" communications rules may be generated using ML classification using data features like SPLT, IP packet RTT, server port(s), graph theoretic features such as min-cut/simrank and bipartite graph inferences. The training set consists of examples of local-networks traffic as positives and general IoT traffic as negatives.

"local-networks" rules are generated using ML classification using data features like SPLT, number of FQDN DNS requests in common, number of domain name DNS requests in common, number of similar certificate SANs, and so on. The training set consists of examples of same-manufacturer traffic as positives and general IoT traffic as negatives.

Internet communications rules may be generated from the unclassified data using wildcard processing with regular flow data (e.g., protocols, ports, and hosts) enriched with DNS and reverse DNS names bound to the flow external addresses.

"manufacturer" communications rules may be generated from the remaining data using wildcard processing with regular flow data (e.g., protocols, ports, and hosts) enriched with DNS and reverse DNS names bound to the flow external addresses.

"controller" rules may be generated from the remaining data with wildcard processing by matching flows to well-known uniform resource name (URN) services (e.g., DNS, network time protocol (NTP), etc.).

"model" rules may be assumed to be generated only out of band if an external device identification technique is available that can correlate flows to specific devices, serial number ranges, firmware version numbers, software version numbers, manufacturer names, model names, etc.

When training is complete, MUD files corresponding to policies are generated and uploaded securely in the MUD Controller operated by the network. Example types of policies that will get generated from the gleaned data may be categorized in allowing (or disallowing):

local communication over protocols and ports (like DNS, DHCPv4/6, ICMPv6) necessary for getting basic connectivity;

communications with controllers or cloud components necessary for the operation of the device;

communications from a set of devices from a manufacturer;

other communications from the endpoint over certain protocols (e.g., constrained application protocol (COAP)) and ports, and the security protocols used;

inbound communications to a limited set of ports and protocols to the endpoint; and any combination of the above categories, and other categories deemed helpful to the generation of suitable policies.

Notably, while the generated MUD policies 470 are bound to the Device+Manufacturer or device Class or other classifications of device fingerprints (particularly where a device cannot be identified with its manufacturer), devices may, in certain embodiments, be classified to belong to more than one class, such as, for example, a multi-functional device (e.g., both a camera and an actuator) or a device that belongs to multiple classes (e.g., a class for any camera and a class for any type device of a given manufacturer). In such a case, multiple policies can be merged/combined and applied to the endpoint.

In accordance with one or more embodiments herein, a generated MUD policy may be associated with a relative "confidence factor", indicating how certain the classification process 248 is in the MUD policy mapped to the particular device fingerprint. For example, if a MUD policy actually exists from the manufacturer of the device, and the device can be positively identified, then the confidence factor can be a maximum value (e.g., 1, 100%, or other scale maximums). However, if an original MUD definition does not exist for a given device, then, as mentioned previously, the creation of one can be based on the traffic profiling above from the one device or from a collection of devices with the same fingerprint (e.g., of the same model number or firmware revision number). The resulting MUD definition will thus have a confidence score less than the maximum (e.g., less than 1 or 100%), and may be established based on the amount of traffic, the number of different samples seen, the number of policy violations (e.g., possibly due to incorrect policies before a refinement can occur), the duration of the observation, and so on. If a large set of devices with the same model number are seen, and the number of deviations are low, then confidence score would thus be high. (However, in one example embodiment, a confidence score cannot be the maximum unless a true MUD file exists.)

Regarding refinement of the derived MUD policies, it is important to note that the techniques herein may be configured to quickly monitor the network traffic and develop an associated policy for rapid distribution into the network. However, not all devices will go through every possible action/state within that initial time period. For example, a first traffic set from a given device may only include TCP 443 traffic, whereas later traffic may include TCP 80 as well. If the original policy only allows TCP 443 traffic, then legitimate TCP 80 traffic will be flagged as an anomaly, or possibly blocked. The more data that is received from a given model, therefore, the more the MUD policies can be refined with only certain true outliers being flagged as potential anomalies. That is, anomalies (policy deviations) can be used to dynamically retrain and refine the MUD definition, in order to account for new behavior over time (e.g., distinguishing and adjusting for regular data versus once-a-month updates or other unexpected but legitimate traffic or other behaviors). As device firmware is updated, the derived MUD policies may undergo fairly rapid update to account for modified device behaviors.

Said differently, because the policies generated from the violation logs are based on less data, they will be reevaluated shortly after being deployed to verify that the traffic conforms to the classifiers expectations. As such, by determining whether additional traffic is legitimate versus malicious (or otherwise illegitimate), the techniques herein may thus create a more confident policy over time for managing the previously joined devices, as well as newly joining devices with the same fingerprints/identification.

For example, for at regular time intervals, the techniques herein can evaluate policy violation logs to assess if they are legitimate, thus using these logs to enrich the identification of policy deviations as mentioned above. For instance, for each interval the system herein can create a new test sample based on the logs for matching types of communications in MUD (e.g., local-network, my-controller, same-manufacturer, etc.). Example violation data features include blocked src_ip, dest_ip, src_port, dst_port, protocol, etc. Missing features such as SPLT, RTT, and so on may be imputed and the sample may be classified in the corresponding classifier to see if it constitutes a policy violation. In addition to evaluating policy violation logs at regular time intervals, the device's traffic may be continuously monitored and all current MUD rules for the device may be reevaluated by the appropriate classifier to ensure the traffic isn't malicious or unwanted. This reevaluation could also age out obsolete MUD rules (for example those associated with obsolete device firmware configurations that are no longer used in the network).

According to one or more embodiments of the present disclosure, while reinforced learning can happen throughout the life of the dynamic MUD service, once initial learning has completed, the system herein can be configured to offer a "pseudo-MUD" service to consumers. That is, since the created MUD policies are from a third party (i.e., not from the manufacturer of the device), the MUD files produced are not signed by the manufacturer of the IoT device in question. This pseudo-MUD file derived according to the techniques herein may thus be signed by the third party service provider, and offered to clients/administrators of IoT networks. The consumer can then either choose to configure their network in accordance with the MUD file, or they can use it as a "check and balance" for what they're seeing in the network and what they expect of the device. For example, in the classification phase of this invention, a consumer that has a new IoT device can submit a traffic profile and device "information packet" to the third party pseudo-MUD service. This packet may then be processed by the system herein to determine the device's fingerprint and thus its classification as described above in order to apply (or create) the appropriate MUD policy.

In this instance, in accordance with certain embodiments described above, the MUD file itself may have a confidence score associated with it that will indicate how certain the system is that the MUD file represents the IoT device's overall network access requirements. As such, the consumer may determine, based on the confidence of the classification, whether to use the MUD file generated by the third party service provider (i.e., based on how much they trust the third party and the confidence score). Notably, multiple "brands" of third party MUD service providers could exist that independently derive the pseudo-MUD files, and administrators of IoT networks can choose which provider is the most accurate, trustworthy, or best serves their device data requirements. Moreover, while a third-party MUD file would typically only be used when the device does not have a true MUD file, a consumer could still choose to check the manufacturer MUD file against one from a third party service, which may be helpful if some sort of compromise, mis-identification, or spoofing is suspected, or if the manufacturer's standard MUD file is incomplete or erroneous, and one of the available third-party MUD files is more suited to the network administrator's needs.

Figure 5:
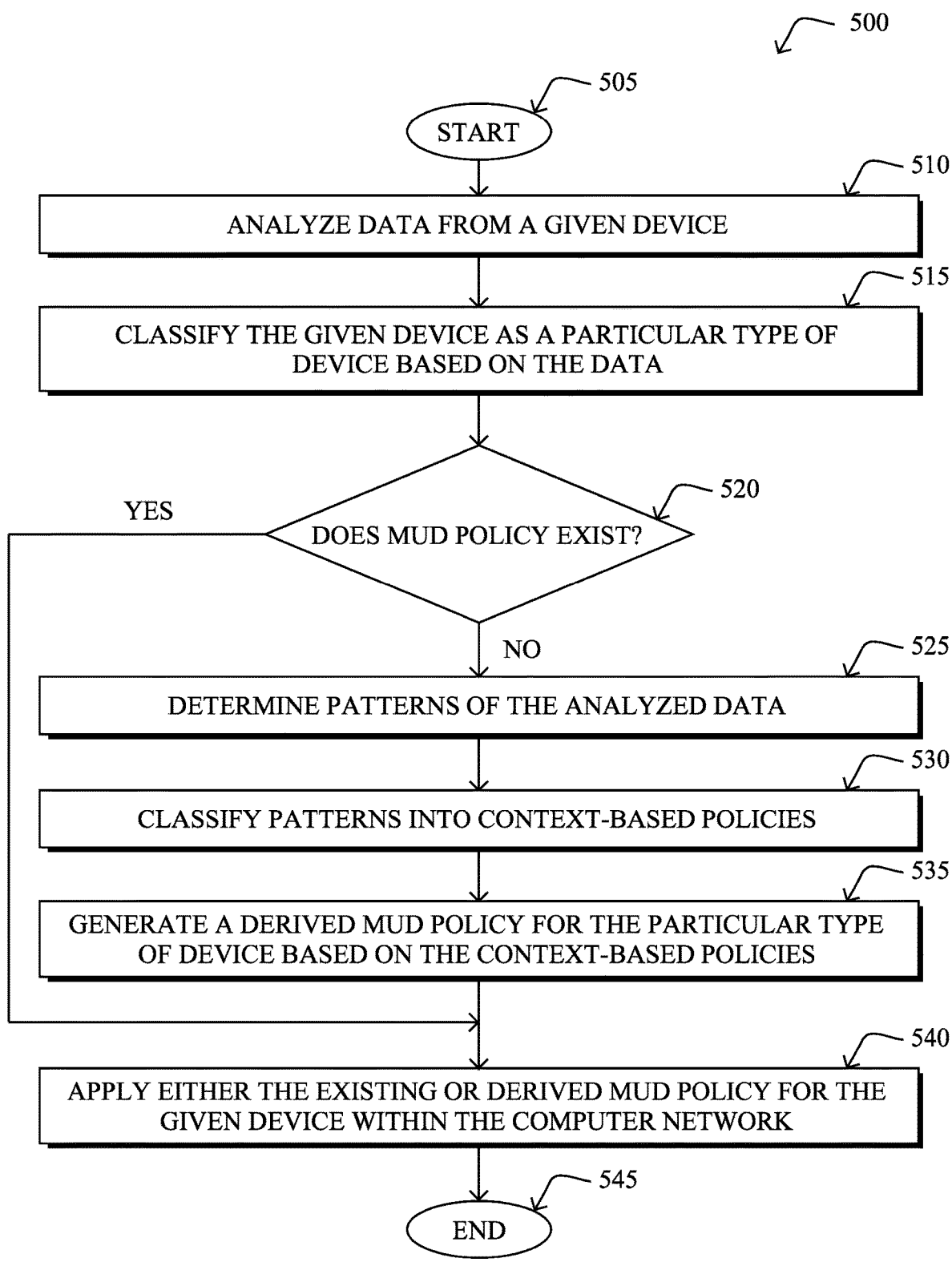
FIG. 5 illustrates an example simplified procedure for online generation and updates of MUD policies.

FIG. 5 illustrates an example simplified procedure for online generation and updates of IoT MUD policies in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, a "classification device" in a computer network (e.g., analytics training center 320) analyzes data from a given device (e.g., endpoint 305) in the computer network, such as by monitoring traffic to/from the device (e.g., including flow record data, model numbers, etc.), or else in alternative embodiments, receiving an explicit request for a derived MUD file that has supplied information to allow classification of the given device (e.g., the "information packet" for the third-party pseudo-MUD example given above).

According to the techniques herein, in step 515, the given device may be classified as a particular type of device based on the data, and then in step 520 the classification device determines whether a MUD policy exists for the particular type of device (that is, whether a true manufacturer's MUD policy or else a MUD policy based on previously classified devices, as described above).

In response to there being no existing MUD policy for the particular type of device, then in step 525 the classification device may determine patterns of the analyzed data, and, as described in greater detail above, may classify the patterns into context-based policies in step 530. For example, various "functionality roles" may be determined for the network addresses analyzed within the data (e.g., manufacturer, devices of a same manufacturer, controller, my-controller, and so on), such that context-based policies can be defined according to the functionality roles. Classifying the analyzed data can illustratively be based on features such as a number of connection, bytes transferred, hostname/port pairs, packet RTT, periodicity of communication, and SPLT, and so on. As also mentioned above, the context-based policies may be enriched based on such things as DNS flows, HTTP URIs, TLS certificate info, known application protocols, policy violation logs, and others. Note that as also described above, the patterns may be supplemented with training data (e.g., from a lab) having restrictive rules for classifying the patterns into context-based policies (e.g., restrictive policies).

Accordingly, in step 535, the classification device may generate a derived MUD policy 470 for the particular type of device based on the context-based policies, as described above (that is, where the context-based policies comprise context-based access control policies (e.g., ACLs) for traffic to the given device and context-based access control policies for traffic from the given device).

In step 540, the classification device may then apply one of either the existing or derived MUD policy for the given device within the computer network, as described above. As also mentioned above, a derived MUD policy may be applied despite there being an existing MUD policy, e.g., to confirm or enhance the manufacturer's own MUD policy. Furthermore, the derived MUD may have a determined confidence level, such that the derived MUD policy may be applied only in response to the confidence level surpassing some threshold confidence (e.g., based on administrator selection of the confidence level, or through other selection criteria, such as the best confidence level amongst a plurality of third-party MUD policy choices).

It is important to note that although referenced as a single "classification device", the "classification device" of the techniques herein may comprise a plurality of cooperative devices that coordinate to determine MUD policies and direct configuration of network devices to control network traffic related to the given device accordingly (e.g., network policy enforcer 315 receiving MUD policy from network MUD controller 325, and configuring the appropriate edge network element 310). Notably, the plurality of cooperative devices could comprise a hierarchical network of fog nodes, for example.

The simplified procedure 500 may end in step 545, notably with the ability to refine the derived MUD policy based on subsequently classified devices of the particular type of device (e.g., monitoring additional data from the given device for changes to the patterns, and either classifying the changes as legitimate and adjusting derived MUD policy in response, or else classifying the changes as malware).

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for online generation and updates of IoT MUD policies. In particular, the techniques herein allow for greater MUD utilization within a network, both in terms of adoption and functionality, regardless of a device manufacturer's support of the MUD standard. That is, the security benefits provided by MUD are maintained for devices that do not support MUD, while MUD policies for unknown IoT devices do not need to be manually analyzed and configured. In fact, using the techniques herein, MUD policies can be applied quickly after an IoT device is first seen, and then refined as time goes on, leveraging IoT datasets and the structured nature of IoT traffic, increasing the efficacy relative to a solution built for general endpoints. Advantageously, this can enable IoT networks to scale with minimal effort, and react quickly to changing device behaviors or threat landscapes. Conventional techniques today are simply aggregating network flows and generating rules that match these flows, while the techniques herein use a detailed set of data features that are processed accordingly in order to generate a granular MUD-compliant policy, as described above. Additionally, the techniques herein can also be used to provide checks and balances, and independent verification of device identities, which will improve the trustworthiness of networks.

While there have been shown and described illustrative embodiments that provide for online generation and updates of IoT MUD policies, it is to be understood that various other adaptations and modifications may be made within the spirit and scope of the embodiments herein. For example, while certain embodiments are described herein with respect to IoT and MUD specific terminology and embodiments, the techniques herein are not limited as such and may be used with any suitable technology, in other embodiments. In addition, while certain protocols or machine learning algorithms are shown, other suitable protocols or algorithms may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/flash/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   analyzing, by a classification device in a computer network, data from a given device in the computer network;
   classifying, by the classification device, the given device as a particular type of device based on the data;
   determining, by the classification device, whether a manufacturer usage description (MUD) policy exists for the particular type of device;
   in response to there being no existing MUD policy for the particular type of device:
      determining, by the classification device, patterns of the analyzed data;
      classifying, by the classification device, the patterns into context-based policies; and
      generating, by the classification device, a derived MUD policy for the particular type of device based on the context-based policies;
   applying, by the classification device, one of either the existing or derived MUD policy for the given device within the computer network;
   monitoring additional data from the given device for changes to the patterns; and
      one of either classifying the changes as legitimate and adjusting derived MUD policy in response or classifying the changes as malware; and
      re-evaluating the additional data to classify the changes as obsolete and aging out the existing or derived MUD policy.

2. The method as in claim 1, wherein applying comprises:
   directing configuration of one or more network devices to control network traffic related to the given device.

3. The method as in claim 1, wherein the existing MUD policy is a previously derived MUD policy based on previously classified devices of the particular type of device.

4. The method as in claim 1, further comprising:
   refining the derived MUD policy based on subsequently classified devices of the particular type of device.

5. The method as in claim 1, wherein classifying the patterns into context-based policies comprises:
determining functionality roles of network addresses analyzed within the data; and
defining the context-based policies according to the functionality roles.

6. The method as in claim 5, wherein functionality roles are selected from a group consisting of: manufacturer; devices of a same manufacturer; controller; and my-controller.

7. The method as in claim 1, further comprising:
determining a confidence level in the derived MUD policy; and
applying the derived MUD policy only in response to the confidence level surpassing a threshold confidence.

8. The method as in claim 1, wherein the data from the given device comprises an explicit request for a derived MUD file and supplied information to allow classification of the given device.

9. The method as in claim 1, wherein the data from the given device comprises a model number of the given device.

10. The method as in claim 1, wherein the context-based policies comprise context-based access control policies for traffic to the given device and context-based access control policies for traffic from the given device.

11. The method as in claim 1, further comprising:
supplementing the patterns with training data having restrictive rules for classifying the patterns into context-based policies.

12. The method as in claim 1, further comprising:
applying the derived MUD policy despite there being an existing MUD policy.

13. The method as in claim 1, wherein classifying the patterns of context-based policies is based on one or more features selected from a group consisting of: number of connections; bytes transferred; hostname:port pairs; packet round-trip time (RTT); periodicity of communication; and sequence of packet lengths and inter-arrival times (SPLT).

14. The method as in claim 1, further comprising:
enriching the context-based policies based on one or more of: domain name server (DNS) flows; hypertext transfer protocol (HTTP) uniform resource identifiers (URIs); transport layer security (TLS) certificate info; known application protocols; and policy violation logs.

15. A tangible, non-transitory, computer-readable medium storing program instructions that cause a computer to execute a process comprising:
analyzing data from a given device in the computer network;
classifying the given device as a particular type of device based on the data;
determining whether a manufacturer usage description (MUD) policy exists for the particular type of device;
in response to there being no existing MUD policy for the particular type of device:
determining patterns of the analyzed data;
classifying the patterns into context-based policies; and
generating a derived MUD policy for the particular type of device based on the context-based policies;
applying one of either the existing or derived MUD policy for the given device within the computer network; and
monitoring additional data from the given device for changes to the patterns; and one of either
classifying the changes as legitimate and adjusting derived MUD policy in response; or
classifying the changes as malware; and
re-evaluating the additional data to classify the changes as obsolete and aging out the existing or derived MUD policy.

16. The computer-readable medium as in claim 15, wherein the process further comprises:
refining the derived MUD policy based on subsequently classified devices of the particular type of device.

17. The computer-readable medium as in claim 15, wherein the process, when classifying the patterns into context-based policies, comprises:
determining functionality roles of network addresses analyzed within the data; and
defining the context-based policies according to the functionality roles.

18. The computer-readable medium as in claim 15, wherein process the further comprises:
determining a confidence level in the derived MUD policy; and
applying the derived MUD policy only in response to the confidence level surpassing a threshold confidence.

19. An apparatus, comprising:
one or more network interfaces to communicate with a computer network;
a processor coupled to the network interfaces and configured to execute one or more process; and
a memory configured to store a process executable by the processor, the process when executed configured to:
analyze data from a given device in the computer network;
classify the given device as a particular type of device based on the data;
determine whether a manufacturer usage description (MUD) policy exists for the particular type of device;
in response to there being no existing MUD policy for the particular type of device:
determine patterns of the analyzed data;
classify the patterns into context-based policies; and
generate a derived MUD policy for the particular type of device based on the context-based policies;
apply one of either the existing or derived MUD policy for the given device within the computer network and
monitor additional data from the given device for changes to the patterns; and one of either
classify the changes as legitimate and adjusting derived MUD policy in response; or
classify the changes as malware; and
re-evaluate the additional data to classify the changes as obsolete and aging out the existing or derived MUD policy.

* * * * *